UNITED STATES PATENT OFFICE.

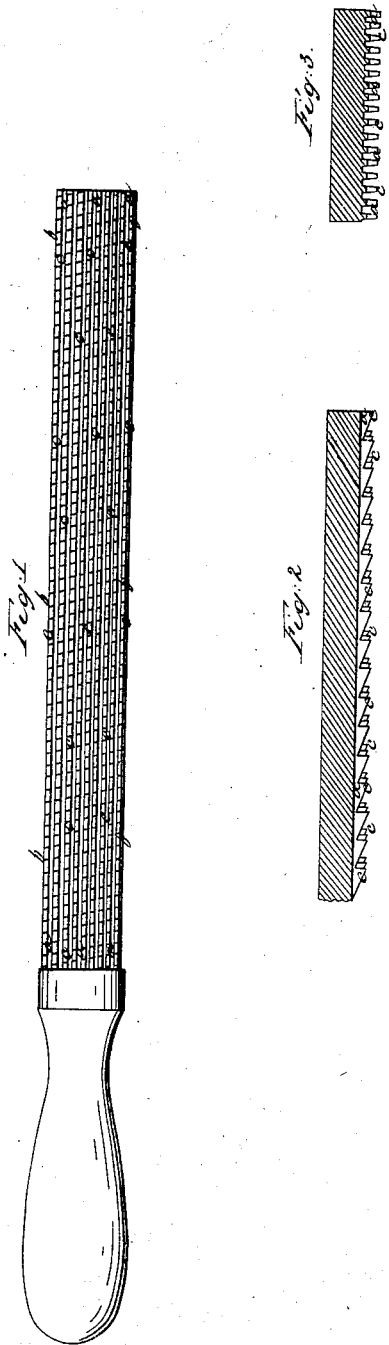

PIETRO CINQUINI, OF WEST MERIDEN, CONNECTICUT.

FILE.

Specification of Letters Patent No. 27,691, dated April 3, 1860.

*To all whom it may concern:*

Be it known that I, PIETRO CINQUINI, of West Meriden, in the county of New Haven and State of Connecticut, have invented a new and useful Improvement in Files; and I do hereby declare that the following is a full, clear, and exact description of the same, reference being had to the accompanying drawings, forming part of this specification, in which—

Figure 1 is a face view of a file constructed according to my invention. Fig. 2 a longitudinal section of a portion of the same, on an enlarged scale. Fig. 3 a transverse section of the same, on the same scale as Fig. 2.

Similar letters of reference indicate corresponding parts in the several figures.

My invention is more especially applicable to files for filing soft metals and their alloys, and wood, its object being to prevent the clogging of the teeth, which is the cause of so much trouble in the use of files of ordinary "cut" on such materials, and to this end my invention consists in the combination, with a suitable transverse "cut" of longitudinal grooves.

To enable other skilled in the art to make and use my invention, I will proceed to describe its construction and operation.

The files may be made of any of the ordinary forms, flat, taper, round, half round, &c., though the drawing simply represents one of the flat form, as that is sufficient to illustrate my invention.

$a$, $a$, are the longitudinal grooves, which constitute the distinguishing characteristic of my invention. These may be cut by burs, by a planing machine, by chisels, or in any other suitable manner, or may be formed by the combination of a number of parallel pieces of steel plate, arranged and secured together side by side, with strips of less depth between them to leave a sufficient projection to form the teeth $c$, $c$. The said grooves may be of uniform width from top to bottom or tapered so as to give a greater width between the tops of the teeth, and to make the teeth narrower at the top or edge as represented in the drawing. The transverse cuts $b$, $b$, which combine with the longitudinal grooves to form the teeth $c$, $c$, may cross the said grooves either squarely or obliquely as represented, but I prefer the latter arrangement, and may be "cross-cut" that is to say, there may be two transverse cuts crossing each other obliquely in opposite directions to the longitudinal groove; and I do not confine myself to any system of transverse cutting. The transverse cutting may be produced by a chisel, a bur, or by any other means.

Files cut on this system are not only less liable to have their teeth clogged in the filing of soft metals, and wood, than those of ordinary cut, or than rasps, but if clogged, are more easily cleaned, as by running a pointed instrument along the grooves $a$, $a$, from the tang or handle toward the point any clogging particles are easily detached. The greenest woods may be filed with them for a long time without becoming so clogged as to interfere materially with their operation.

What I claim as my invention, and desire to secure by Letters Patent, is,

Constructing a file with longitudinal grooves, and a transverse cut combining with said grooves to form teeth, substantially as herein described.

PIETRO CINQUINI.

Witnesses:
 R. P. RAND,
 WALTER HUBBARD.